United States Patent Office 3,152,333
Patented Oct. 6, 1964

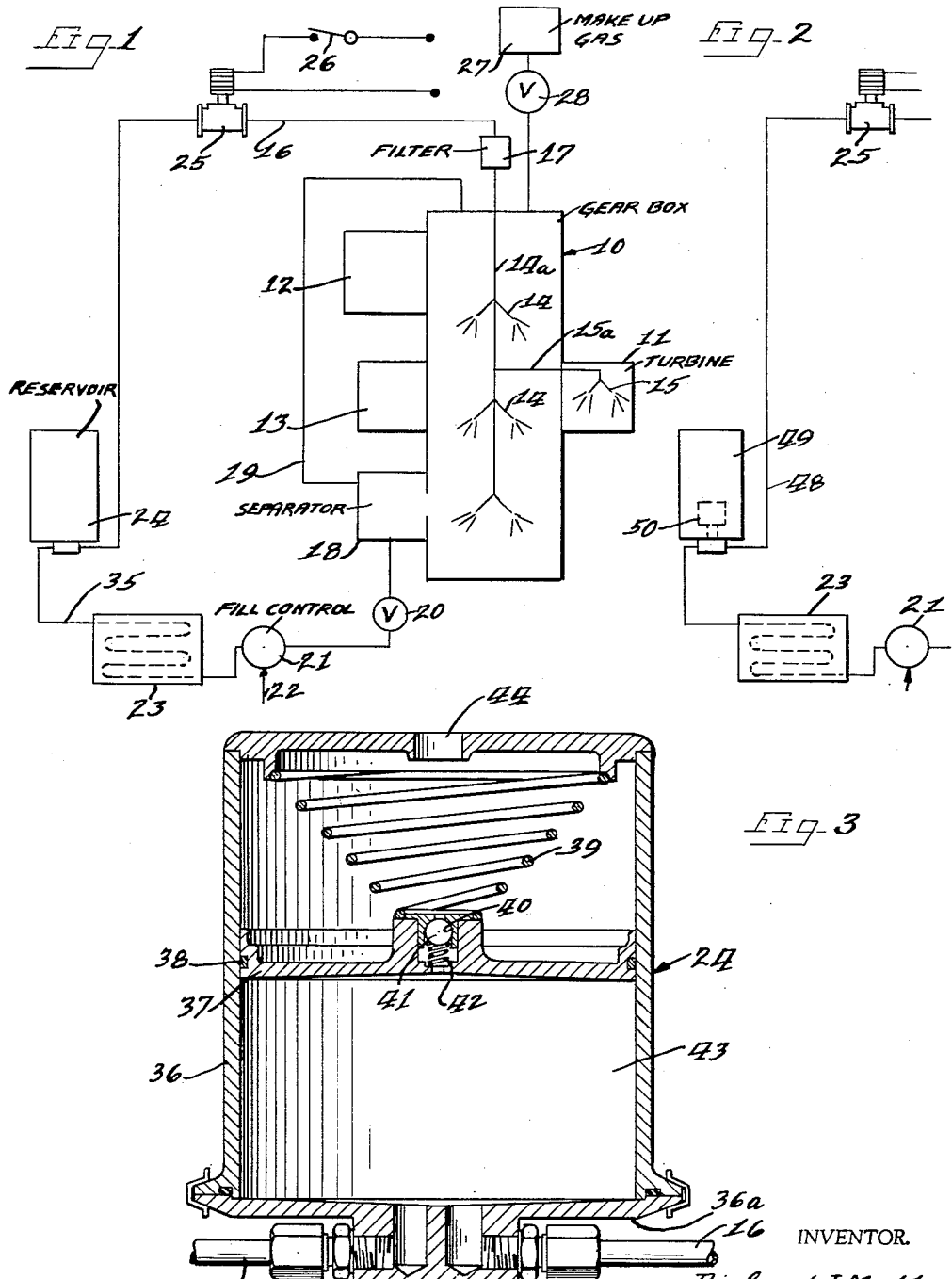

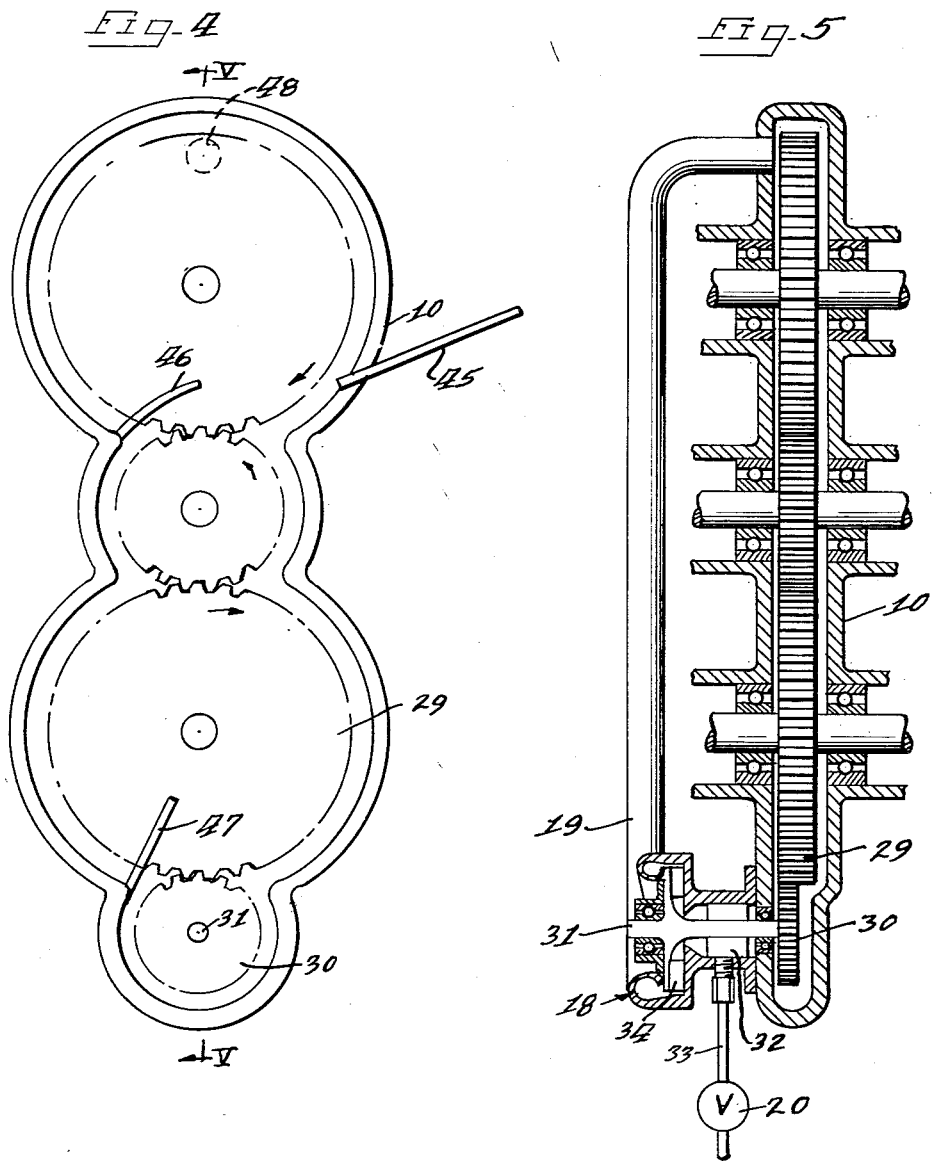

3,152,333
GAS ASSISTED ZERO GRAVITY LUBRICATION SYSTEM
Richard J. Matt, South Euclid, Ohio, assignor to Thompson Ramo Wooldridge Inc., Cleveland, Ohio, a corporation of Ohio
Filed Oct. 18, 1961, Ser. No. 145,957
8 Claims. (Cl. 184—6)

The present invention relates to improvements in lubricating systems and particularly to an improved system suitable for use at zero gravity conditions.

The capability for establishing useful commercial, scientific and military satellites and for exploring the solar system, will depend upon power for communications, control, guidance, and propulsion of the satellite and space vehicles. To satisfy the power requirements of large space vehicles, dynamic systems capable of operating in full gravity, reduced gravity and zero gravity environments must be employed, and continued lubrication is essential to proper operation of the systems. The behavior of fluid lubricants varies in gravity and zero gravity conditions and effects on the fluids such as boiling, heat transfer, and problems of fluid transport must be accommodated. It is essential that a lubrication system be of complete and maximum reliability, be light in weight and inexpensive. The lubrication system must provide a continual supply of lubricant to the moving surfaces, and must perform a cooling effect.

The problems of heat transfer for cooling have been established in gravitational fields but at conditions of zero gravity the factors are changed. The boiling of the liquid lubricant influences its effectiveness, and the wetability of heated surfaces will influence the rate of boiling of the liquid in contact with the surface and will also influence the size and shape of bubbles which will in turn, affect the heat transfer. There are two possible modes of boiling, nucleate or bubble boiling, and film boiling. The normal condition is to have nucleate boiling with transition to film boiling occurring at high heat transfer rates. However, under conditions of zero gravity, depending upon the fluids and the surface adhesion and cohesion, boiling will occur immediately when the cohesive force of the liquid is greater than the adhesive force between the film and the heated surface. Even when the cohesive force is less than the force of adhesion, the translation to film boiling should occur at a very low rate of heat transfer. A given container and fluid therefore will have a change from nucleate to film boiling at a small change in temperature for a zero gravity state. Even though the temperature situation in a vehicle is not extremely high, this boiling and heat transfer phenomenon must be taken into consideration because the unit may operate in a vacuum. The lubrication system must be stable in two phases of operation and control must be maintained in the vapor and liquid phase without difficulty. The vapor must be prevented from entering the pumping system or removed to prevent vapor lock and slugging in the system.

In states of partial and zero gravity, standard methods of fluid movement cannot be followed with a guarantee that the fluid will be present at the inlet to pumps or controls at the proper time. Also, the conventional method of venting cannot be used because the top or surface of the fluid or gas phase cannot be conveniently located while the fluid is in the state of zero gravity.

It is accordingly an object of the present invention to provide a lubrication system having a positive expulsion or positive fluid transporting method for positively moving the fluid and maintaining it in proper contact with the surfaces for efficient and effective heat transfer.

A further object of the invention is to provide a zero gravity lubrication system obtaining better control of the fluid and gas phases thus preventing vapor lock and preventing suspended liquid from stagnating in a dead corner of the lubrication system such as in loops, reservoirs, or in the gear box of the arrangement.

A further object of the invention is to provide a lubrication system for a prime mover and gear drive having a facility for transporting the lubricant with minimum difficulty through the necessary cooling and lubricating loops and where the prime mover has a low operating torque and high efficiency with a small amount of power absorbed in the lubricant and rotating parts.

A further object of the invention is to provide a power unit and lubrication system capable of operation under zero gravity conditions, which is capable of short time operation but also has growth capabilities for operating for extended periods.

A further object of the invention is to provide a lubricating system employing a liquid lubricant with an inert gas for preventing oxidation of the lubricant and for enhancing movement of the lubricant through the system.

A feature of the invention is the provision of a lubricating system using liquid jet and splash lubrication removing the lubricant as quickly as possible after it has left the area requiring lubrication to avoid flooding the engagement area of the gears or bearings and the additional frictional drag caused by components running submerged in oil with a pressure balance maintained in the lubricant control system.

A further object of the invention is to provide a zero gravity lubricating system wherein the frictional surfaces and the gearbox are void of fluid during storage and the system is opened only at the time of operation to pump lubricant for lubrication of the rotating part and for cooling.

Other features, objects and advantages will become more apparent with the teaching of the principles of the invention in connection with the disclosure of the preferred embodiment thereof in the specification, claims and drawings, in which:

FIGURE 1 is a schematic showing of a lubricating system embodying the principles of the present invention;

FIGURE 2 is a schematic showing of a portion of the system of FIGURE 1 embodying a modification thereof;

FIGURE 3 is an enlarged vertical sectional view taken through the reservoir for the system;

FIGURE 4 is a vertical sectional view shown in somewhat schematic form of a gearbox and lubricating mechanism; and FIGURE 5 is a vertical sectional view taken substantially along line V—V of FIGURE 4.

As shown on the drawings:

FIGURE 1 illustrates the lubricant control system for lubricating gears within a gearbox 10, which is also shown in FIGURES 4 and 5. The gears are driven from a turbine 11, and drive power accessories as shown at 12 and 13.

The lubricant is delivered to jets 14 for the moving surfaces in the gearbox and to jets 15 for the turbine bearing surfaces. Separate lines 14a and 15a are provided for the jets 14 and 15 for the gearbox and turbine to separate the flow. Thus the lubricant flows through two loops 14a and 15a with one loop seeing the hot turbine and the other the cooler gearbox, and it has been found that this separating arrangement has a less damaging effect on the total lubricant supply. The lubricant is carried from the lubricated surfaces by a centrifugal force due to engagement with the moving lubricated surfaces and gear faces, and slinger rings, not shown, may be provided for moving the lubricant quickly away from the lubricating surfaces to avoid submersion of the components in lubricant which generates excessive loads and in turn, excessive heat. The moving surfaces are designed to provide a force in excess of one "G" to insure positive flow at any altitude, in any position, or at any gravitational force.

A flow of inert gas such as nitrogen is passed through the gearbox to aid and augment lubricant removal, as will be further described.

The oil passes out of the gearbox into a separator 18 and the separated gas and vapor is passed through a return line 19 back into the gearbox. The separated lubricant flows past a separator valve 20 and through a heat exchanger 23. A fill control valve 21 is shown with a make-up supply 22 to maintain lubricant in the system. The lubricant flows up to a reservoir 24 which is designed to maintain a discharge pressure at all times in the line 16 leading back to the gearbox. A filter 17 is provided in the return line.

Also provided in the return line 16 downstream of the reservoir 24 is a jet control starting valve 25 which is closed during storage of the mechanism and which is opened at a start signal. The valve 25 is shown as being electrically operated by a switch 26 which may be closed to open the valve. Thus the gearbox 10 is void of lubricant during storage, and is supplied with lubricant only when starting, and the reservoir 24 maintains a pressure at the starting valve 25 so that lubricant is immediately provided to the gearbox when the valve 25 is opened.

Make-up gas is provided from a make-up gas supply 27 and this is monitored into the gearbox through a pressure transducer 28 to provide make-up gas required to keep the gearbox 10 at a desired level of pressure for the best lubricant transport.

Nitrogen is used as an inert gas for blanketing and to minimize oxidation and promote lubricant and carbon seal life. The oil removal from the gearbox is dependent upon the drag force exerted on the fluid particles by the nitrogen as it passes through the gearbox and is therefore dependent upon the velocity difference between the particles and gas. It has been discovered that a nitrogen velocity of 50 feet per second is sufficient to remove all lubricant oil particles smaller than 0.01 inch in diameter. It is not necessary to remove the larger particles since they, through centrifugal action, impinge upon the walls and the brushing action of the gear teeth will soon reduce them to smaller diameters. Assuming that the oil particles have random motion within the gearbox with a net average of velocity of approximately zero, the average velocity at the point of exit of the gearbox will be 2 ft./sec. for those particles having a diameter of 0.01 inch and about 24 ft./sec. for those having a diameter of $10^{-4}$ inches or less. As above discussed, slingers, rotating components, and gas pressure direct the lubricant through the gearbox through baffles and passages to the separator 18.

As shown in FIGURE 5, the separator 18 is shown as being a centrifugal type, and it operates to separate the lubricant from the gas when a sufficient lubricant head is established to open the control valve 20. At that point the lubricant is pumped out through the heat exchanger to the reservoir 24. The separated nitrogen is pressurized by the separator and returned to the gearbox through the line 19. Thus the separator functions to both separate gas from the lubricant and pressurize the gas for recirculation.

The separator 18 is shown driven by the gears 29 and has a driving gear 30 mounted on its shaft 31. Supported on the shaft are fan vanes 32 which separate the liquid from the gas by means of the differences in their density. When the lubricant has accumulated in a sufficient quantity to create a predetermined pressure head, it flows out through the valve 20. As the lubricant thickness decreases around the periphery of the separator chamber, the head decreases and the valve 20 closes preventing the passage of gas into the lubricant line through the valve 20. This is desired to prevent vapor lock and slugging problems during zero gravity operation. The gas passes into the centrifugal impeller stage 34 of the separator and is boosted in pressure so that it can be pumped back to the gearbox through line 19 and create a pressure differential across the unit. This will again induce lubricant-gas flow through the gearbox passages to the separator.

The oil droplets are brought into the separator by the nitrogen and are being constantly accelerated as they approach the separator. As an example, with an installation having the velocity of the gas entering the separator at 143 ft./sec., the velocity of the particles may vary from 37 ft./sec. for those particles having a diameter of 0.01 inch to a maximum of 135 ft./sec. for particles of 0.0001 inch diameter or less. These velocities, of course, are dependent upon the distances between the gearbox exit and the entrance to the separated vanes. A distance of 1 inch has proven satisfactory.

A knowledge of the particle velocity makes possible a calculation to determine the total percentage of lubricating oil removed if the size range of the particles is known. These percentages can, of course be increased if necessary by providing a larger oil area of the separator vanes which in turn will require higher input power.

Thus the recirculation line including the line 35 from the gearbox to the reservoir 24 and the return line 16 from the reservoir to the gearbox handles only liquid lubricant with the gas and vapor being separated therefrom. After flowing through the heat exchanger 23 the lubricant enters the reservoir 24 which includes a cylindrical tank 36 with a piston 37 slidably mounted therein and a piston seal ring 38 at the outer periphery of the piston. The piston is spring loaded by a spring 39 to maintain a substantially constant reservoir pressure in the chamber 43. The piston may also be pressure activated as will be appreciated by those skilled in the art.

In the filling position, the piston 37 is butted against the lower end cap 36a of the reservoir. The lubricant is brought into the reservoir and the piston moves upwardly along the chamber 43 to fill. The gas behind the piston is vented by a port 44. The control valve 25 downstream of the reservoir prevents lubricant from squirting out through the gearbox line. Any entrapped vapor in the reservoir is bled off through the release valve 41 which rests against the seat 40 in the piston 37 and is held thereagainst by a spring 42. After following the filling procedure a solid mass of fluid is present. The seals 38 around the piston are a special lapped piston ring design which have an exceedingly low leakage rate even at high temperatures.

FIGURE 4 shows a scavenger drain conduit 45 which is not necessary but which may be added to draw lubricant away from the closing side of the gears and will be connected to a line leading down to the separator through connections, not shown. Guide vanes 46 and 47 within the gearbox 10 aid in directing the lubricant downwardly toward the separator.

The ideal location for delivering gas to the gearbox is through a port on the side surface of the gears, as illustrated by the port 48. The location of the port in the gearbox at this point does not bubble the gas through the liquid because, since centrifugal force is throwing it past this opening during operation, it has been found that the amount of air mixing or gas mixing is greatly reduced. Therefore this arrangement is reducing foaming and increasing the reliability of the unit.

While a centrifugal separator is shown at 18, it will be understood that this may be augmented by a gas-oil separator of the type employing a filter of a size to pass gas but which will not pass liquid, or a filter separator may be used solely with a pump means being provided to circulate lubricant through the recirculation line and a pump to pressurize the recirculated gas.

In some circumstances it may be desirable to utilize a vapor-swallowing pump in the reservoir, as indicated at 50 in FIGURE 2, within the reservoir 49. The lubricant recirculating line 48 is in other respects similar to the arrangement of FIGURE 1 with a heat exchanger 23 and a control valve 25 interposed therein. The vapor-swallowing pump 50 will provide a partial gravity environment and will aid in circulating the lubrcant and will remove vapor from the system. The arrangement of FIGURE 1 is lighter, less complex, and avoids the necessity of providing a vapor-swallowing pump and the necessity of providing an additional unit of mechanism.

The delivery of the lubricant to the individual bearing surfaces is preferably accomplished through dual jets 180° apart so that the plugging of one jet will not cause the lubrication starvation and possible failure. Two jets also provide for more even heat removal.

In summary, the lubricant flows through the jets 14 for the gearbox bearing surfaces, into the jets 15 for the turbine surfaces, and is carried centrifugally and by close proximity of the box to the gears down to the separator 18 where the separated gas is pumped through a return line 19 back to the housing, and the lubricant is delivered to the reservoir 24. The control valve 25 is kept open during normal operation, and is closed for storage of the unit with the reservoir 24 maintaining pressure for instantaneous supply to the system. Make-up gas is provided from a make-up supply 27.

Thus the arrangement provides an improved lubrication system which meets the objectives and advantages above set forth. The system provides instantaneous starts with positive lubricant feed and reliable lubricant transport in the unit in any gravity condition. The arrangement also provides positive gas and lubrication separation with gas make-up and lubricant supply sufficient to handle evaporation and seal losses. The arrangement provides efficient cooling to provide low bulk oil temperatures and minimum decomposition, and inert gas blankets the lubricant to minimize lubricant oxidation.

The drawings and specification present a detailed disclosure of the preferred embodiment of the invention, and it is to be understood that the invention is not limited to the secific form disclosed, but covers all modifications, changes and alternative constructions and methods falling within the scope of the principles taught by the invention.

I claim as my invention:

1. A lubrication system capable of operation under conditions of zero gravity comprising a closed lubrication circuit including arranged in series flow relationship, a housing containing a bearing area to be lubricated, a lubricant line having a receiving end connected to the housing to receive lubricating fluid and a return end connected to the housing to return lubricating fluid, an inert gas delivering means connected to the housing for forcing lubricant through the housing, a gas separator for separating gas from fluid flowing through said line, and a control valve in the line for being closed during storage of the system and for being opened for running operation.

2. A lubrication system capable of operation under conditions of zero gravity comprising a closed lubrication circuit with elements arranged in series flow relationship, including a housing containing a bearing area to be lubricated, a lubricant line having a receiving end connected to the housing to receive lubricating fluid and a return end connected to the housing to return lubricating fluid, means for forcing fluid through said circuit, and means for carrying fluid through the housing including an inert gas inlet into the housing and means for supplying gas thereto at a velocity of the order of 50 feet per second.

3. A lubrication system capable of operation under conditions of zero gravity comprising a closed lubrication circuit with elements arranged in series flow relationship including a housing containing a bearing area to be lubricated, a lubricant line having a receiving end connected to the housing to receive lubricating fluid and a return end connected to the housing to return lubricating fluid, an inert gas delivering means connected to the housing for forcing lubricant through the housing, a gas separator located at the receiving end of said line for separating gas from fluid leaving said housing, and a gas return conduit connected between said separator and the housing for returning separated gas to the housing.

4. A lubrication system capable of operation under conditions of zero gravity comprising a closed lubrication circuit with elements arranged in series flow relationship including a housing containing a bearing area to be lubricated, a lubricant line having a receiving end connected to the housing to receive lubricating fluid and a return end connected to the housing to return lubricating fluid, means for directing a flow of inert gas through the housing to aid in moving fluid therethrough, a reservoir in said line, and a vapor swallowing pump in said reservoir moving fluid through the line and separating inert gas.

5. A lubrication system capable of operation under conditions of zero gravity comprising a closed lubrication circuit having elements in series flow relationship including a housing containing a bearing area to be lubricated, a lubricant line having a receiving end connected to the housing to receive lubricating fluid and a return end connected to the housing to return lubricating fluid, means for forcing lubricant through the circuit, a control valve downstream of said forcing means for being closed during storage of the system and for being opened for running operation, an inert gas delivering means connected to the housing forcing lubricant through the housing, a gas separator for separating gas from fluid flowing through said line, and a gas return conduit connected between said separator and the housing for returning separated gas to the housing.

6. A lubrication system capable of operation under conditions of zero gravity for lubricating gears in a gearbox comprising a sealed housing, means for introducing lubricant into the housing, means for delivering a flow of gas through the housing to carry particles of lubricant through the gearbox, an inlet port for the gas positioned adjacent the periphery of one of the gears within the gearbox, and means for removing lubricant and gas from the gearbox.

7. A lubrication system capable of operation under conditions of zero gravity comprising a closed lubrication circuit arranged in series flow relationship including a housing containing a bearing area to be lubricated, a lubricant pressure line having a receiving end connected to the housing to receive lubricating fluid and a return end connected to the housing to return lubricant, means for forcing lubricant through the circuit under pressure in said line, comprising a pressure chamber connected to said line and maintained pressurized by pressure in the line, a first control valve in the line downstream of the pressure chamber, a second control valve in the line upstream of the pressure chamber opened by a predetermined pressure tending to force lubricant toward the pressure chamber and closing with the drop below said predetermined pressure, and operating means for the first valve selectively operable for closing the first valve during storage of the system and maintaining presssure in said line and in said storage chamber and opening the first valve during running operation.

8. A lubrication system capable of operation under conditions of zero gravity comprising a closed lubrication circuit arranged in series flow relationship including a housing containing a bearing area to be lubricated, a lubricant line having a receiving end connected to a housing to receive lubricant and a return end connected to the housing to return lubricating fluid, means for forcing lubricant through the circuit under pressure in said line, comprising a pressure chamber connected to said line and maintained pressurized by pressure in the line, a first control valve in the line downstream of the pressure chamber, a second control valve in the line upstream of the pressure chamber opened by a predetermined pressure upstream of the second valve tending to force lubricant toward the pressure chamber and closing below said predetermined pressure, operating means for the first valve selectively operable for closing the first valve during storage of the system and maintaining pressure in said line and in said storage chamber and opening the first valve during running operation, and a heat exchanger in said line for cooling fluid before it is returned to said housing.

References Cited by the Examiner
UNITED STATES PATENTS

| | | | |
|---|---|---|---|
| 1,728,268 | 9/29 | Flanders | 184—6 |
| 2,214,485 | 9/40 | Short | 184—6 |
| 2,417,747 | 3/47 | Flowers | 184—6 |
| 2,664,173 | 12/53 | Karig | 184—6 |
| 2,672,278 | 3/54 | Newcomb | 184—6 |
| 2,693,248 | 11/54 | Gaubatz et al. | 184—6 |
| 2,800,119 | 7/57 | Schmidl | 184—6 |
| 2,834,432 | 5/58 | Sacks | 184—6 |
| 2,930,448 | 3/60 | Burnham | 184—6 |
| 3,006,357 | 10/61 | Woerner | 184—6 |

LAWRENCE D. GEIGER, *Primary Examiner.*

M. KAUFMAN, *Examiner.*